United States Patent [19]

Aramaki

[11] Patent Number: 5,745,462
[45] Date of Patent: Apr. 28, 1998

[54] RECORDING APPARATUS HAVING A RECORDING OPERATION CONTROLLED BASED UPON SILENT PORTIONS OF INPUTTING DATA

[75] Inventor: Junichi Aramaki, Chiba, Japan

[73] Assignee: Sony Corporation, Tokyo, Japan

[21] Appl. No.: 844,363

[22] Filed: Apr. 17, 1997

Related U.S. Application Data

[60] Continuation of Ser. No. 561,895, Nov. 22, 1995, abandoned, which is a division of Ser. No. 319,258, Oct. 6, 1994.

[30] Foreign Application Priority Data

Oct. 8, 1993 [JP] Japan ................... 5-253458

[51] Int. Cl.$^6$ ........................................ G11B 3/90
[52] U.S. Cl. ................................. 369/58; 369/32
[58] Field of Search ....................... 369/47, 48, 50, 369/54, 58, 116, 32, 33, 124, 83, 84, 85; 360/13, 15

[56] References Cited

U.S. PATENT DOCUMENTS

| | | | |
|---|---|---|---|
| 4,782,401 | 11/1988 | Faerber et al. | 358/335 |
| 4,841,503 | 6/1989 | Yamada et al. | 369/14 |
| 4,932,016 | 6/1990 | Yoshida et al. | 369/48 |
| 5,065,388 | 11/1991 | Roth et al. | 369/47 |
| 5,124,963 | 6/1992 | Ando | 369/58 X |
| 5,140,567 | 8/1992 | Kawabata et al. | 369/13 |
| 5,146,369 | 9/1992 | Yamaguchi | 369/15 |
| 5,179,543 | 1/1993 | Nara et al. | 369/3 |
| 5,257,111 | 10/1993 | Kakuyama | 358/342 |
| 5,295,126 | 3/1994 | Okano et al. | 369/47 |
| 5,301,181 | 4/1994 | Shiba et al. | 369/84 |
| 5,311,492 | 5/1994 | Tabuchi et al. | 369/47 |
| 5,319,628 | 6/1994 | Stas et al. | 369/54 |
| 5,325,352 | 6/1994 | Matsumoto | 369/275.1 |
| 5,331,617 | 7/1994 | Fuma et al. | 369/54 |
| 5,337,199 | 8/1994 | Arai et al. | 360/8 |
| 5,343,452 | 8/1994 | Maeda et al. | 369/32 |
| 5,345,433 | 9/1994 | Ohga et al. | 369/54 |
| 5,363,362 | 11/1994 | Maeda et al. | 369/54 |
| 5,377,167 | 12/1994 | Maeda et al. | 369/47 |
| 5,414,688 | 5/1995 | Inokuchi | 369/84 |
| 5,420,838 | 5/1995 | Maeda et al. | 369/32 |
| 5,420,843 | 5/1995 | Yoshida | 369/58 |
| 5,432,768 | 7/1995 | Terashima et al. | 369/58 |
| 5,442,608 | 8/1995 | Umeda et al. | 369/44.27 |
| 5,452,281 | 9/1995 | Otoguro | 369/85 |
| 5,457,667 | 10/1995 | Kojima et al. | 369/32 |
| 5,485,443 | 1/1996 | Niwayama | 369/54 |
| 5,487,047 | 1/1996 | Oka | 369/32 |

FOREIGN PATENT DOCUMENTS

| | | | |
|---|---|---|---|
| 0 097 768 A2 | 1/1984 | European Pat. Off. | G11B 5/58 |
| 0257594 A2 | 3/1988 | European Pat. Off. | G11B 7/013 |
| 0288571 A1 | 11/1988 | European Pat. Off. | G11B 27/00 |
| 0308148 A3 | 3/1989 | European Pat. Off. | G11B 20/10 |
| 0 364 224 A1 | 4/1990 | European Pat. Off. | G11B 7/095 |
| 0419012 A2 | 3/1991 | European Pat. Off. | G11B 7/28 |

(List continued on next page.)

OTHER PUBLICATIONS

"Database WPIL", No. 81 B0881D, Derwent Publications Ltd., London; & SU-A-737 879 (Suskov V M).

*Primary Examiner*—Paul W. Huber
*Attorney, Agent, or Firm*—Limbach & Limbach L.L.P.

[57] ABSTRACT

A method and apparatus for recording control for a recording medium having a data recording region for recording data such as audio data, speech data, and a control data region for recording control data for the data recording region. The method and apparatus includes identifying a non-silent recorded portion and a silent recorded portion of the data recorded in the data recording region based upon the signal level of the data recorded in the data recording region, and recording control data for separating the data recorded in the data recording region into temporally former and temporally latter portions at a boundary portion between the non-silent recorded portion and the silent recorded portion based upon the results of the identification after recording of the data in the data recording region has ended.

4 Claims, 7 Drawing Sheets

FOREIGN PATENT DOCUMENTS

| | | | |
|---|---|---|---|
| 0480682 A2 | 4/1992 | European Pat. Off. | G11B 27/30 |
| 0506471 A1 | 9/1992 | European Pat. Off. | G11B 7/007 |
| 0511633 A2 | 11/1992 | European Pat. Off. | G11B 27/031 |
| 0612067 A2 | 8/1994 | European Pat. Off. | G11B 7/28 |
| 4216593 A1 | 12/1992 | Germany | G11B 7/00 |
| 2-123588 | 5/1990 | Japan | G11B 27/00 |
| 4-114384 | 4/1992 | Japan | G11B 27/034 |
| 4-258834 | 9/1992 | Japan | G11B 11/10 |
| 737879 | 1/1977 | U.S.S.R. | |
| WO 90/12395 | 10/1990 | WIPO | G11B 7/28 |

|   | 16BIT EVEN m | | 16BIT ODD m | |
|---|---|---|---|---|
|   | MSB WmB LSB | MSB WmA LSB | MSB WmB LSB | MSB WmA LSB |
|   | d1  d8 | d1  d8 | d1  d8 | d1  d8 |
| 0 | 00000000 | 11111111 | 11111111 | 11111111 |
| 1 | 11111111 | 11111111 | 11111111 | 11111111 |
| 2 | 11111111 | 11111111 | 11111111 | 00000000 |
| 3 | CLUSTER H | CLUSTER L | 00000000 | 00000000 |
| 4 | 00000000 | 00000000 | 00000000 | 00000000 |
| 5 | 00000000 | 00000000 | 00000000 | 00000000 |
| 6 | 00000000 | 00000000 | 00000000 | 00000000 |
| 7 | 00000000 | 00000000 | 00000000 | 00000000 |
| 8 | 00000000 | 00000000 | 00000000 | 00000000 |
| 9 | 00000000 | 00000000 | 00000000 | 00000000 |
| 10 | 00000000 | 00000000 | 00000000 | 00000000 |
| 11 | 00000000 | 00000000 | 00000000 | P-EMPTY |
| 12 | 00000000 | P-TNA1 | P-TNA2 | P-TNA3 |
| 13 | P-TNA4 | P-TNA5 | P-TNA6 | P-TNA7 |
| 14 | P-TNA8 | P-TNA9 | P-TNA10 | P-TNA11 |
| 15 | P-TNA12 | P-TNA13 | P-TNA14 | P-TNA15 |
| 16 | P-TNA16 |   |   |   |
| 17 |   |   |   |   |
| ... |   |   |   |   |
| 73 |   |   |   |   |
| 74 | P-TNA248 | P-TNA249 | P-TNA250 | P-TNA251 |
| 75 | P-TNA252 | P-TNA253 | P-TNA254 | P-TNA255 |
| 76 | DISC NAME | | | |
| 77 | DISC NAME | | | LINK-P |
| 78 | DISC NAME OR TRACK NAME | | | |
| 79 | DISC NAME OR TRACK NAME | | | LINK-P |
| 80 | DISC NAME OR TRACK NAME | | | |
| 81 | DISC NAME OR TRACK NAME | | | LINK-P |
| 82 | DISC NAME OR TRACK NAME | | | |
| 83 | DISC NAME OR TRACK NAME | | | LINK-P |
| 84 | DISC NAME OR TRACK NAME | | | |
| 85 | DISC NAME OR TRACK NAME | | | LINK-P |
| 86 |   |   |   |   |
| ... |   |   |   |   |
| 481 |   |   |   |   |
| 482 |   |   |   |   |
| ... |   |   |   |   |
| 534 |   |   |   |   |
| 535 |   |   |   |   |
| ... |   |   |   |   |
| 586 | DISC NAME OR TRACK NAME | | | |
| 587 | DISC NAME OR TRACK NAME | | | LINK-P |

(×4BYTE)   ←1   ←2   ←3   ←4

Rows 0–2: HEADER. Rows 3–587: DATA AREA (2336 BYTE).

FIG.4

RECORDING APPARATUS HAVING A RECORDING OPERATION CONTROLLED BASED UPON SILENT PORTIONS OF INPUTTING DATA

This is a continuation of application Ser. No. 08/561,895 filed on Nov. 22, 1995, now abandoned, which is a divisional of Ser. No. 08/319,258 filed Oct. 6, 1994, pending.

BACKGROUND

1. Field of the Invention

The present invention relates to an apparatus for recording on a recording medium and a method for controlling the recording process. More particularly, the present invention relates to a recording apparatus for recording on a recording medium under control based on the data signal level, and a method for controlling the recording process.

2. Background of the Invention

An optical disc may have a recording capacity two to three orders of magnitude larger than a magneto-optical disc and permits higher speed access than with a tape-shaped recording medium. Since the optical disc also has such merits as high durability and contact-free data recording/reproduction, it has recently being employed in increasing numbers.

There are several types of optical discs, such as a read-only optical disc having a read-only area with data recorded as pits, conforming to a standard CD (Compact Disc) format, referred to hereinafter as a CD-DA format, a magneto-optical disc, in the form of a magneto-optical recording medium having a recording/reproducing area conforming to a CD-MO format as an extension format of the CD-DA format, and a hybrid disc having both the read-only area with data recorded as pits and a recording/reproducing area having a magneto-optical recording layer in which the data is recorded on or reproduced from the magneto-optical recording layer.

If, in a data recording/reproducing apparatus for recording data on a disc-shaped recording medium, such as a magneto-optical disc or a hybrid disc, the recording data become useless data during recording, the recording is discontinued by a manual operation. If a song or other audio program are to be recorded from a CD to a magneto-optical disc, the recording by the magneto-optical disc recording/reproducing apparatus is discontinued by a manual operation after the end of reproduction by the CD player.

In a disc-shaped recording medium, such as an optical disc or a magneto-optical disc, there are provided a main data recording area for recording main data, such as audio data or speech data or general data, and a control data recording area for recording control data.

In the data recording/reproducing apparatus for the disc-shaped recording medium, the pre-recorded area and the non-recorded recordable area are controlled by control data recorded in the control data recording area. For example, in the optical disc conforming to the CD-DA format, the recording start address information and the recording end address information are sequentially recorded for all of the program data in a lead-in region as a table-of-contents (TOC) information indicating the recording position and the recording contents of the data region.

The present Assignee has already proposed a recording and/or reproducing apparatus for digitally recording and/or reproducing audio signals or music signals or the like using an optical disc of substantially 64 mm in diameter housed within a disc cartridge. This type of the optical disc may be classified into a read-only optical disc, a recordable disc such as a magneto-optical disc and a hybrid disc having both the read-only region and the recordable region. In the magneto-optical disc capable of data recording and reproduction, the program region and the U-TOC region (user TOC region) are provided in the recordable region, and the TOC data indicating the recording position and the recording contents of the program region, referred to herein as U-TOC data, are recorded in the U-TOC region.

With such disc recording/reproducing apparatus, the recording is discontinued by a manual operation. As a result, if only songs or programs, such as audio or music data, are designated using the program reproduction function of the CD player to be recorded, and a song or program smaller in data quantity than the capacity of the recording side is reproduced, a silent recorded portion, such as a portion recorded zero-level audio data, is produced on the end after the end of the reproduction on the source side. In order to prevent the silent portion from being recorded on end, it is necessary to watch the state of the source and to terminate recording as soon as the reproduction of the source side comes to a close.

On the other hand, if recording is not discontinued by a manual operation, the silent portion continues to be recorded up to the end of the recordable region, such that, unless the silent portion is re-registered as a vacant region, recording cannot be made in succession to the recorded portion.

SUMMARY OF THE INVENTION

It is therefore an object of the present invention to provide an apparatus for recording on a recording medium which resolves the above-mentioned problems.

It is another object of the present invention to provide a method for recording control on a recording medium which resolves the above-mentioned problems.

According to the present invention, there is provided a recording apparatus for recording data on a recording medium having a data recording region for recording data and a control data region for recording control data for the data recording region. The apparatus includes a time measurement unit which measures the time during which the signal level of data recorded in the data recording region is below a pre-set level, and recording controller discontinues data recording on the recording medium when the time measured by the time measurement unit exceed a pre-set time duration, and recording control data in the control data region for separating portions of the data recorded in the data recording region beginning from a time point preceding a pre-set time from the end of the data recorded in the data recording region up to the end of the recorded data as being another data.

According to the present invention, there is provided an apparatus for recording on a recording medium having address data pre-recorded thereon and also having a data recording region for recording data based upon the address data and a control data region for recording control data for the data recording region. The apparatus includes a storage unit and a recording controller. The storage unit stores an address when the signal level of the data recorded in the data recording region becomes lower than a pre-set level. The recording controller records control data in the control region for separating data downstream of the address stored in the storage unit as other data, based upon the address data stored in the storage unit after recording of the data in the data recording region has ended.

According to the present invention, there is provided an apparatus for recording on a recording medium having a data recording region for recording data and a control data region for recording control data for said data recording region. The apparatus includes a time measurement unit and a recording controller. The time measurement unit measures the time during which the signal level of data recorded in the data recording region is below a pre-set level. The recording controller discontinues data recording on the recording medium when the time measured by the time measurement unit exceeds a pre-set time duration and records control data in the control data region for separating data recorded in the data recording region into at least two data portions on either side of the time when a pre-set time has elapsed since a time point at which the data level has become lower than the pre-set level.

According to the present invention, there is provided a recording method for recording data on a recording medium having a data recording region for recording data and a control data region for recording control data for the data recording region. The method includes identifying a non-silent recorded portion and a silent recorded portion of the data recorded in the data recording region based upon the signal level of the data recorded in the data recording region, and recording control data in the control data region for separating the data recorded in the data recording region into temporally former and temporally latter portions at a boundary portion between the non-silent recorded portion and the silent recorded portion based upon the results of the identification after recording of the data in the data recording region has ended.

According to the present invention, the recording operation is automatically discontinued at a time point when a pre-set time has elapsed since the time when the data signal level has become lower than a pre-set level, on the basis of the signal level of data recorded in the data recording region of the recording medium, and control data is recorded in the control data region so that data recorded in the data recording region as from the time the data signal level has become lower than the pre-set level will be separated as another data. This enables data recording on the recording medium to be discontinued, while enabling the data recording region on the recording medium to be utilized effectively.

According to the present invention, address data is stored at a time point where the data signal level has become lower than a pre-set level, on the basis of the signal level of data recorded in the data recording region of the recording medium having pre-recorded address data thereon, and control data is recorded after the end of recording on the recording medium on the basis of the stored address data so that data recorded in the data recording region from the stored address data may be taken as another data. This enables the data recording region of the recording medium to be utilized effectively, while enabling data recorded in the data recording region to be separated into the non-silent data portion and the silent data portion automatically.

BRIEF DESCRIPTION OF THE DRAWINGS

The present invention will be more readily understood with reference to the accompanying drawings, wherein:

FIG. 4 illustrates the construction of a sector 1 of the U-TOC of a recording/reproducing region of the disc;

DESCRIPTION OF THE INVENTION

Figure 1:
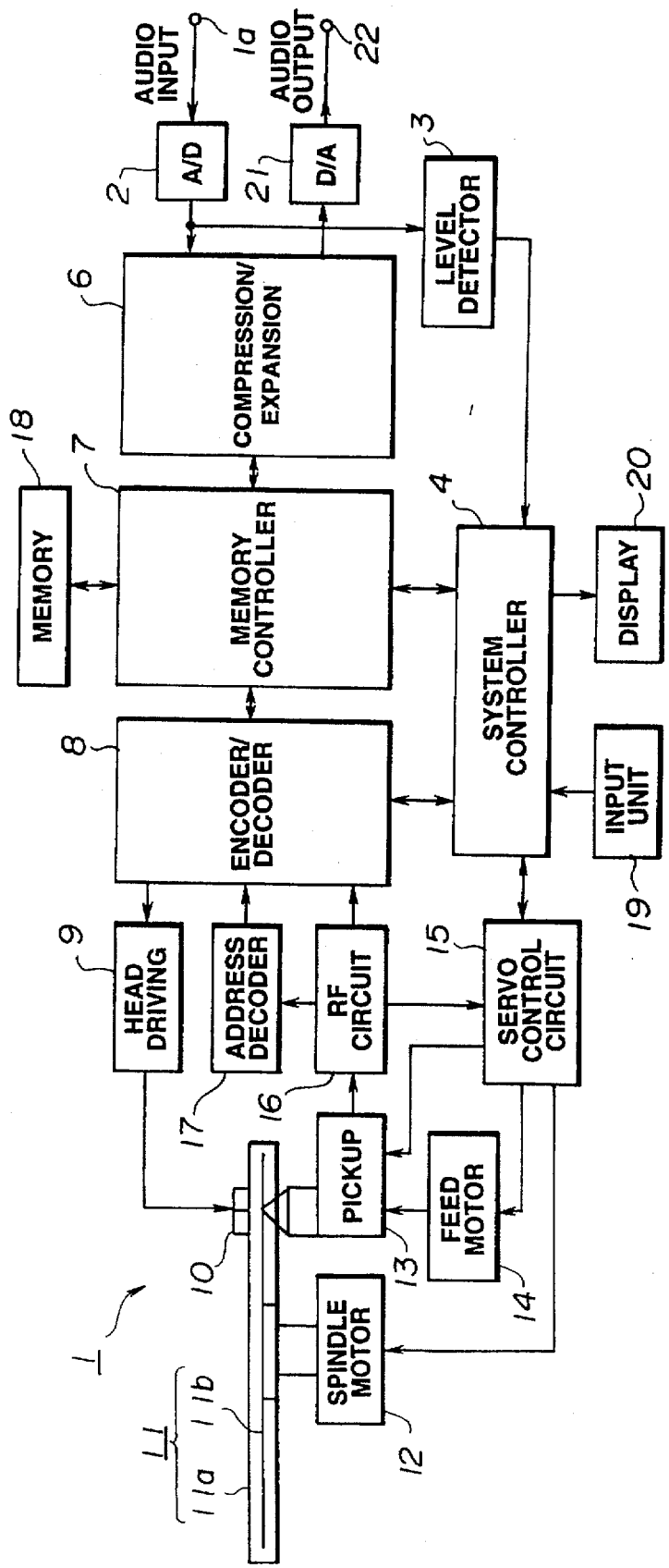
FIG. 1 is a block diagram showing an arrangement of the disc-shaped recording and/or reproducing apparatus embodying the present invention.

Referring to the drawings, the recording apparatus for a recording medium and the method for controlling the recording will be explained in detail. In the following description, a disc recording and/or reproducing apparatus employing a disc-shaped recording medium is taken as an example.

The recording and/or reproducing apparatus according to the present invention is arranged and constructed as shown in a block diagram shown in FIG. 1.

Figure 2:
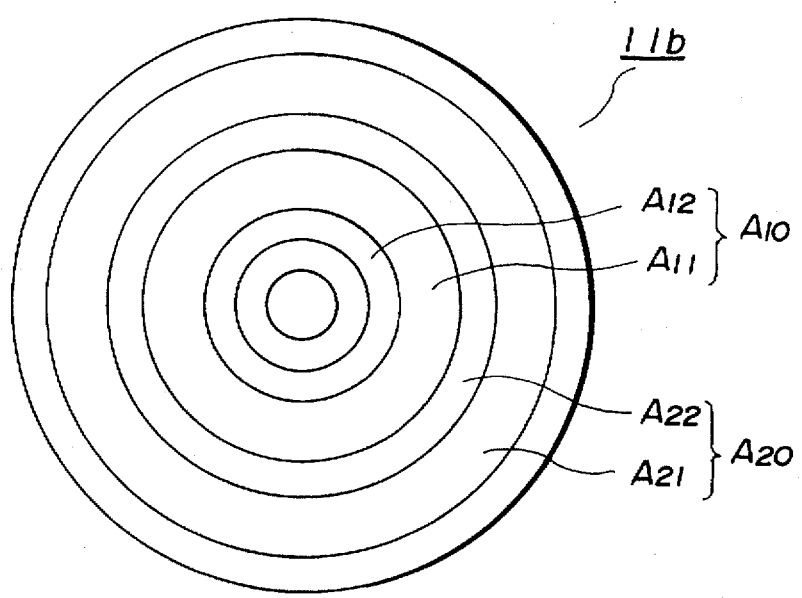
FIG. 2 illustrates a disc employed in the disc-shaped recording and/or reproducing apparatus shown in FIG. 1.

The disc recording/reproducing apparatus, shown in FIG. 1, has a disc 11b of 64 mm in diameter, which is housed within a disc cartridge 11a and which is rotationally driven at a constant linear velocity (CLV) by a spindle motor 12 for data recording and/or reproduction. For example, a hybrid disc 11b having a read-only region A10 and a recording/reproducing region A20 provided outside of the read-only region A10, as shown in FIG. 2, is rotationally driven at CLV by the spindle motor 12.

The read-only region A10 of the hybrid disc 11b has a program region A11 having program data, such as play data, recorded therein, and a lead-in region A12 provided inwardly of the program region A11. In the read-only region A10, digital data are pre-recorded as the presence or absence of pits as physical projections and recesses. In the lead-in region A12, various control data, such as start and end addresses, track or program names, and a disc name are sequentially recorded as TOC data for indicating the recording position or recording contents of all of the program data.

The recording/reproducing region A20 of the hybrid disc 11b has a program region A21 for recording the program data, such as play data, and a U-TOC region A22 provided inwardly of the program region A21. The recording/reproducing region A20 is formed of a magneto-optical recording medium. The recording/reproducing region A20 has a recording track extending along a groove formed as a tracking guide groove. The groove is wobbled for recording a spindle motor 12 controlling sine wave signal as a wobbling signal. The sine wave signal is also frequency modulated for superimposing the address information on the sine wave signal. In the U-TOC region A22, various control data, such as track numbers indicating a series of data recorded in the program region and the positions of the respective regions are recorded as U-TOC data indicating the recording positions and recording contents of data recorded in the program region.

In the U-TOC region A22, the recording/reproducing region for three sectors, that is sectors 0, 1 and 2, are allocated in the U-TOC region A22.

Figure 3:
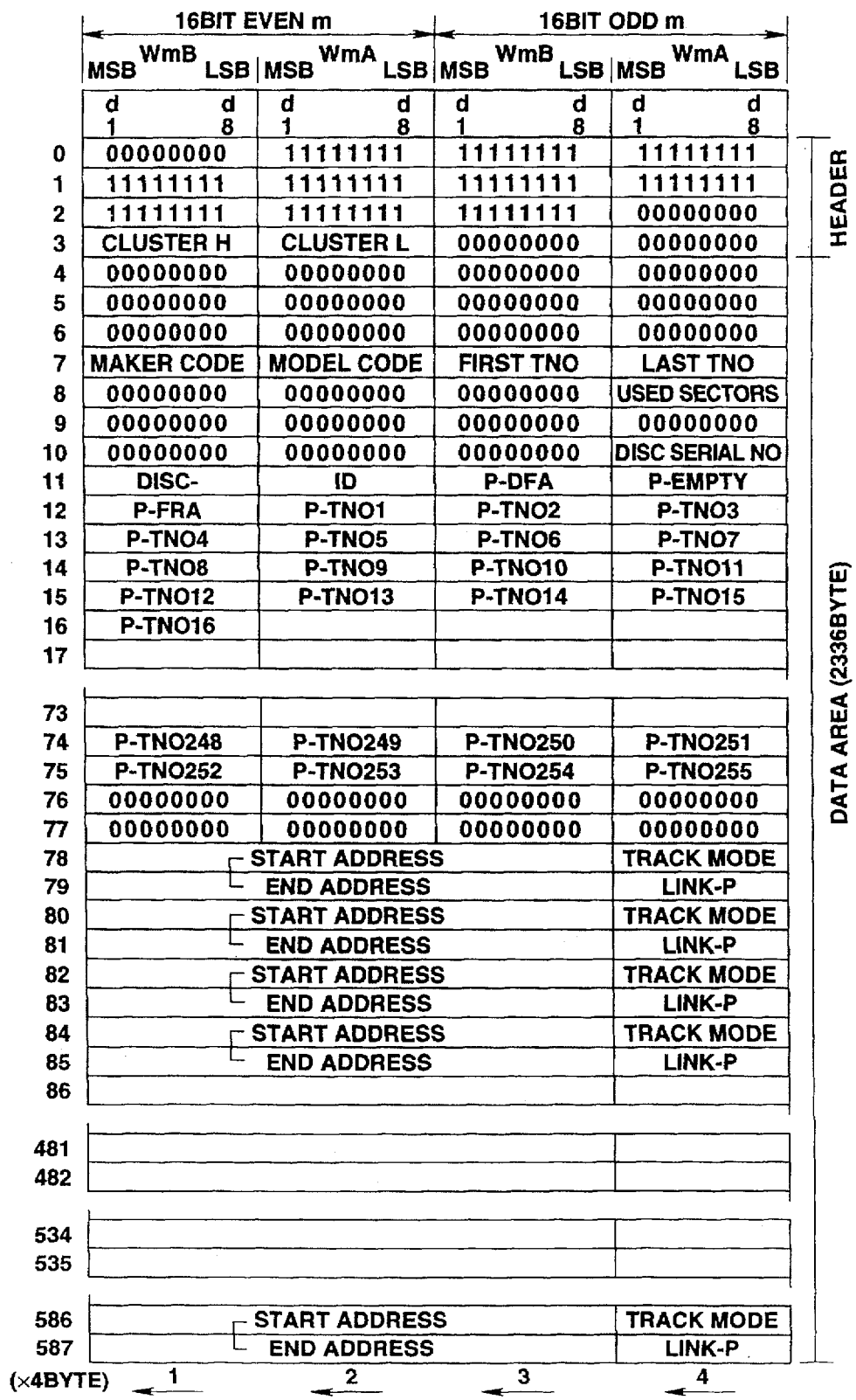
FIG. 3 illustrates the construction of a sector 0 of the U-TOC of a recording/reproducing region of the disc.

In the sector 0 of the U-TOC region A22, the recording state of the disc 11b is recorded, as shown in FIG. 3. A byte P-FRA is used for controlling the recordable region of the disc 11b. In this byte P-FRA, there is recorded a pointer on the sector 0 in which there is a start address indicating the start address of the recordable region. A byte P-TNOn controls the pre-recorded region in the program region A121. In a byte P-TNO-1, there is recorded a pointer on the sector 0 in which there is an address of a start position of the first music data. That is, if there is "1" in the byte P-TNO1, the start and end addresses are recorded, starting at (76+1 ×2)×4 byte of the sector 0 as a leading end. The same holds for a byte P-TNO2 and so forth.

The sector 1 of the U-TOC region A22 is constructed as shown in FIG. 4. In this sector 1, there is recorded the information concerning the disc name and the track name. These disc and track names are recorded in the ASCII code. In a byte P-TNA1, there is recorded the leading address on the sector 1 in which there is recorded the track name of the first music data. If the byte P-TNA1 is "2", the track name of the first music data is recorded with the (76+2×2)×4 byte of the sector 1 as the leading end. The same holds for a byte P-TNA2 and so forth.

Figure 5:
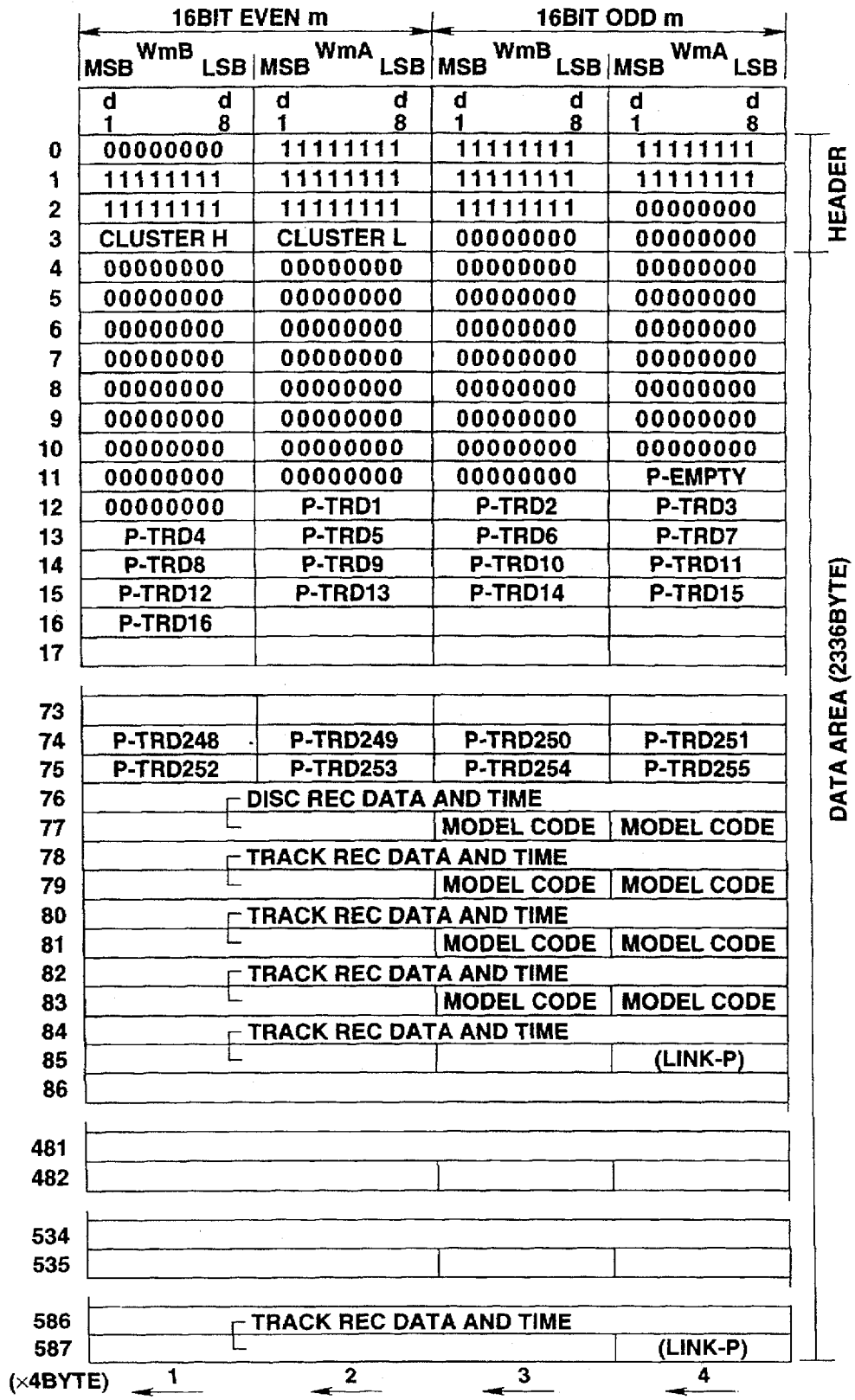
FIG. 5 illustrates the construction of a sector 2 of the U-TOC of a recording/reproducing region of the disc.

The sector 2 of the U-TOC region A22 is constructed as shown in FIG. 5. The sector 2 is reserved for recording the time and date on which the program recording was made. With the disc recording and/or reproducing apparatus, the recording time and data are automatically recorded simultaneously with the recording of each program. In a byte P-TRD1, there is recorded the leading address on the sector 2 in which there is the recording time and date for the first air. That is, if the byte P-TRD1 is "3", there is recorded data concerning the recording time and date for the first air with the (76+3×2)×4 byte of the sector 2 as the leading position. The same holds for a byte P-YDR2 and so forth. The program recording time and date on the disc is recorded with the 76×4 byte of the sector 2 as the leading position.

It is noted that the information Link-P is contained in each track information of the sectors 0 and 1 of the U-TOC region A22. In the sector 0, this byte Link-P indicates, when a program is divided into plural small regions and discretely recorded in this state in the disc 11b, whether or not there is a small region directly following the previous small region. If such a small region exists, the byte Link-P indicates the information P-TNOn. In the sector 1, this byte Link-P indicates where the name of the program is linked next. Consequently, even if the program is erased, two programs are combined together, or the number of letters of the track name is subsequently increased, it is possible to cope with such a situation by employing the information Link-P.

With the present disc recording and/or reproducing apparatus, audio data is magneto-optically recorded along the recording track of the recording/reproducing region A20 of the disc 11b by radiating a light beam by, for example, an optical pickup 13, on the disc 11b rotated at the CLV by the spindle motor 12 and. simultaneously applying a vertical magnetic field modulated in accordance with the recording data by a magnetic head 10. In addition, the audio data is optically reproduced by scanning the recording track of the read-only region A10 and the recording/reproducing region A20 with a light beam by the optical pickup 13. The disc recording and/or reproducing apparatus includes an A/D converter 2 for converting the input analog audio signals into digital signals, a D/A converter 21 for performing a conversion which is the reverse of that performed by the A/D converter 2, and a level detecting circuit 3 for detecting the signal level indicated by the audio data digitized by the A/D converter 2 from the analog signal. The disc recording and/or reproducing apparatus includes a system controller 4 for controlling the operation of the system in its entirety, and a compression/expansion circuit 6 for performing compression and expansion of the output digital signal of the A/D converter 2. The disc recording and/or reproducing apparatus also includes a memory controller 7 for temporarily storing output audio data of the compression/expansion circuit 6 in a buffer memory 18, and an encoder/decoder 8 for performing signal conversion in meeting with the disc format. The disc recording and/or reproducing apparatus also includes a magnetic head driving circuit 9 for driving the magnetic head 10 and a feed motor 14 for moving the magnetic head 10 and the optical pickup 13 in the radial direction of the disc 11b. Finally, the disc recording and/or reproducing apparatus includes a servo control circuit 15 for controlling the spindle motor 12, the optical pickup 13 and the feed motor 14, and an RF circuit 16 for processing an output signal of the optical pickup 13 and routing the processed signal to the encoder/decoder 8, the servo control circuit 15 and to an address decoder 17.

When recording data in the recording/reproducing region A20 of the disc 11b, the optical pickup 13 radiates a light beam on a target track of the recording/reproducing region A20 on which a vertical magnetic field modulated in accordance with recording data is applied by the magnetic head 10 being driven by the head driving circuit 9. As a result, data recording is made photomagnetically in the recording/reproducing region A20. The optical pickup 13 radiates a light beam on the target track and detects the reflected light beam. The optical pickup 13 detects the focusing error by a so-called astigmatic method based on the reflected light beam, while detecting the tracking error by the three-beams method according to the output level of the detected reflected light beam. When reproducing data recorded on the read-only region A10 of the disc 11b, the optical pickup 13 detects changes in the light intensity of the reflected light beam of the radiated light beam from the target track by a photodetector, not shown, for outputting the playback signals. Also, when reproducing data from the recording/reproducing region A20 of the disc 11b, the optical pickup 13 detects the difference in the angle of polarized light (Kerr rotation angle) of the reflected light beam of the radiated light beam from the target track for outputting reproduced signals.

An output signal of the photodetector, not shown, of the optical pickup 13 is routed to the RF circuit 16. The RF circuit 16 generates focusing error signals and tracking error signals for an output signal of the optical pickup 13 and transmits these error signals to the servo control-circuit 13. The RF circuit 16 also extracts address data from an output signal of the optical pickup 13 and transmits the address data to the address decoder 17 and the encoder/decoder 8. The servo control circuit 15 is composed of, for example, a focusing servo control circuit, a tracking servo control circuit, a spindle servo control circuit and a thread servo control circuit. The focusing servo control circuit controls an objective lens of the optical pickup 13 so that the focusing error signal supplied from the RF circuit 16 will be reduced to zero. The tracking servo control circuit controls an optical system or the objective lens of the optical pickup 13 so that the tracking error signal supplied from the RF circuit 16 will be reduced to zero. The spindle servo control circuit controls the spindle motor 12 for rotationally driving the magneto-optical disc 2 at a CLV. The thread servo control circuit controls the feed motor 14 for moving the optical pickup 13 and the magnetic head 10 to the target track position of the disc 11b as designated by the system controller 4. The servo control circuit 15, taking charge of these control operations, transmits the information showing the operating states of various component parts controlled by the servo control circuit 15 to the system controller 4.

The system controller 4 controls the operations responsive to operating inputs by various keys of an input unit 19, such as power source key, ejection key, play key, pause key, stop key or recording key. Also the system controller 4 controls, based on the sector-based address information reproduced from the recording tracks of the disc 11b, the recording position or the playback position on the recording track scanned by the optical pickup 13 and the magnetic head 10. The system controller 4 has enclosed therein a RAM for storage of TOC data read out from the lead-in region A12 of the read-only region A10 of the disc 11b. Based on the TOC data, the system controller 74 controls the playback position of the program region A11 of the read-only region A10. The memory controller 7 stores the U-TOC data read out from the U-TOC region A22 of the recording/reproducing region A20 of the disc 11b in the RAM. The memory controller 7 controls, based on the registered U-TOC data, the recording position or the playback position on the program region A21.

The memory controller 7 also controls display on a display unit 20 of the time information, such as total play time of the disc 11b, the time elapsed since start of play of a music data or an audio data, the remaining play time of the song or program being played and the total remaining play time, or the track number of the music data or the audio data or program. The memory controller 7 also causes the disc name or the track names, if any, of the disc to be displayed on the display unit 20. If the recording time and data of the program or the disc is recorded, the recording time and data are also displayed on the display unit 20.

With the disc recording and/or reproducing apparatus of the present embodiment, the analog audio signal supplied to the input terminal 1a during the recording mode is converted by the A/D converter 2 into a digital signal with the sampling frequency of 44.1 Khz and the quantizing bits equal to 16. The digital audio signal outputted from the A/D converter 2 is routed to the level detection unit 3 and the compression/expansion circuit 6. The compression/expansion circuit 6 performs modified DCT (Discreate Cosine Transform) for converting audio data on the time axis into audio data on the frequency axis, while also performing data compression.

The compressed output audio data from the compression/expansion circuit 6 is once stored via the memory controller 7 in the buffer-memory 18 having a data capacity of not less than one cluster, such as a storage capacity of 1 Mbits, and is read out from the buffer memory and routed to the encoder/decoder 8.

The encoder/decoder 8 performs error correction operations on the audio data read out from the buffer memory 18, using cross interleave Reed Solomon code (CIRC) as the error correction code, and generates recording data by eight-to-fourteen (EFM) modulation.

The recording data thus generated is routed via the head driving circuit 9 to the magnetic head 10. Thus the vertical magnetic field modulated by the recording data is applied to the disc 11b. The optical pickup 13 radiates a light beam having a recordable output level on the disc 11b. This records the recording data photomagnetically on the disc 11b.

Data recording is carried out on the cluster basis. Each cluster is made up of 36 sectors, with each sector corresponding to one subcode block of a CD and made up of 5.5 sound groups. That is, 32 sectors of 36 sectors are allocated to data recording, with the remaining four sectors being used as a linking area for initiation of the vertical magnetic field at the time of starting of recording or for timing matching for controlling the output level of the light beam.

The position on the disc during recording is designated by addresses recorded by wobbling the groove provided on the disc 11b. The address is extracted by the address decoder 17 so as to be routed to the encoder/decoder 8.

During the playback mode, the signal recorded on the disc 11b is read out by the optical pickup 13. An output signal from the optical pickup 13 is routed from the RF circuit 16 as a playback signal to the encoder/decoder 8. The encoder/decoder 8 EFM demodulates the playback signals supplied thereto and performs error correction operations on the playback signals.

The playback data, corrected for errors by the encoder/decoder 8, are once stored in the buffer memory 18 via the memory controller 7. The playback data read out from the buffer memory 18 is routed to the compression/expansion circuit 6. The compression/expansion circuit 6 performs expansion corresponding to compression at the time of recording on the playback data supplied thereto for converting the playback data into audio data on the time axis. The D/A converter 21 converts the audio signals supplied from the compression/expansion circuit 6 into analog audio signal. The analog audio signal outputted from the D/A converter 21 is outputted at an output terminal 22.

The buffer memory 18 has a storage, capacity of storing the playback data continuing for approximately 0.9 second, which corresponds to the analog audio signal continuing for about three seconds. Thus, if the signal recorded on the disc 11b becomes unable to be read out by the optical pickup 13 due to track jump, with the playback data having been stored in the buffer memory to its full storage capacity, the playback signal may be continuously outputted for about three seconds. The optical pickup 13 is restored during this three-second period to the original position prior to track jump and re-accessing and signal re-reading is attempted again in order to prevent an interrupted output signal at the output terminal 22.

Figure 6:
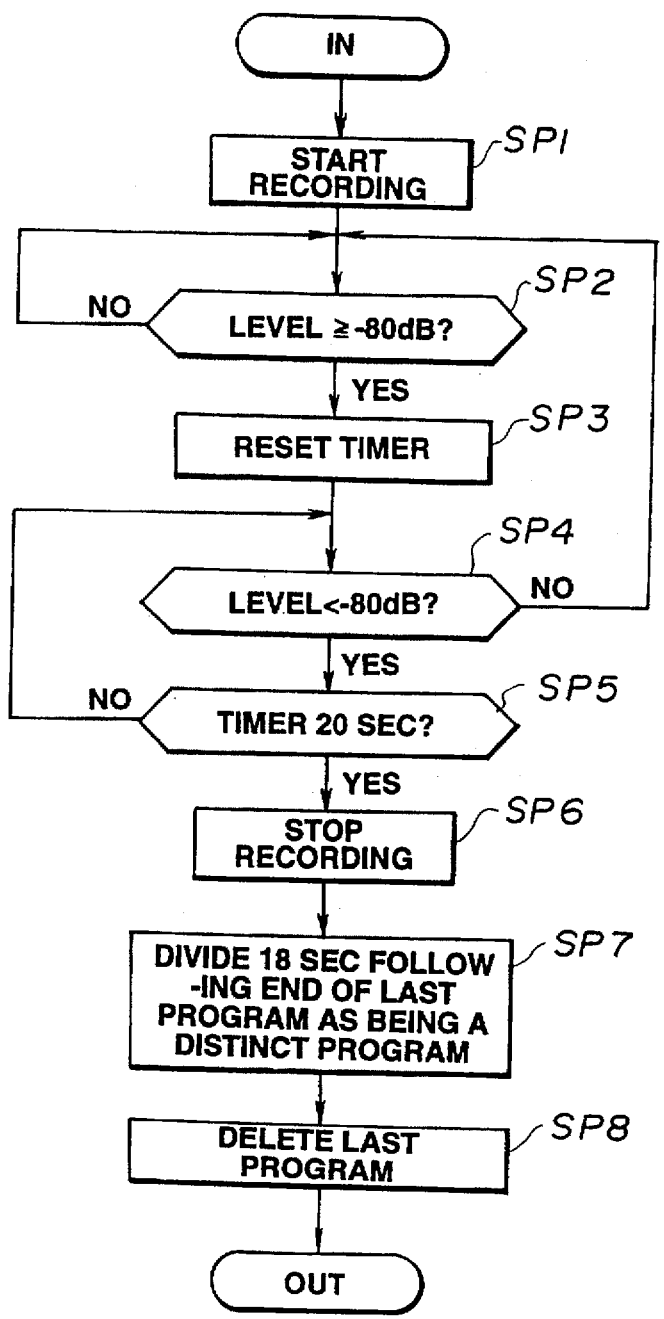
FIG. 6 is a flow chart showing a recording control of a system controller of the disc-shaped recording and/or reproducing apparatus shown in FIG. 1.

When the disc recording and/or reproducing apparatus of the present embodiment performs the above-described recording operation, the system controller 4 performs system control, on the basis of a detection output by the level detector 3, as indicated by the flow chart shown in FIG. 6.

That is, when the recording mode is set, the system controller 4 controls various parts of the apparatus at a step SP1 for starting the recording of the program on the disc 1b. Processing then transfers to a second step SP2.

At the step SP2, it is checked, on the basis of the detection signal by the level detector 3, whether or not the signal level of the audio signal to be recorded, that is the audio level, has reached the pre-set level, for example, −80 dB. At the second step SP2, the above check operation is repeatedly performed until the result of decision is YES, that is until the audio level exceeds −80 dB. That is, the apparatus awaits the delivery of the audio level exceeding −80 dB in the recording state. When the result of decision at the second step SP2 becomes YES, processing transfers to the next step SP3 where the timer is reset. Processing then transfers to the next step SP4.

The timer is enclosed in the system controller 4 and is used for measuring the time interval during which the audio level is below a pre-set level. An address counter for counting the addresses detected by the address decoder 17 may be employed as the timer.

At the fourth step SP4, it is checked, on the basis of the detection signal by the level detector 3, whether or not the audio level has become lower than a pre-set level, for example, −80 dB. If, at the fourth step SP4, the result of decision is NO, that is if the audio level exceeds −80 dB, processing reverts to the second step SP2 in order to perform the operations from the step SP2 up to the step SP4 repeatedly. In this manner, the recording state is continued for the audio signals having the audio level in excess of a pre-set level, while the timer is reset. If, at the fourth step SP4, the result of decision becomes YES, that is the audio level becomes less than −80 dB, processing transfers to the next step SP5.

At the fifth step SP5, it is checked whether or not a pre-set time interval, for example, 20 seconds, has elapsed since the timer is reset at the step SP3. At the fifth step SP5, if the result of decision is NO, that is if the pre-set time interval has not elapsed since the timer is last reset, processing transfers to the fourth step SP4 in order to perform the decision on the audio level iteratively. If the audio level is raised by more than −80 dB before a pre-set time elapses since the timer is last reset, processing reverts from the fourth step SP4 to the second step SP2 in order to continue the recording operation as the timer is reset. If, at the fifth step SP5, the result of decision is YES, that is if the state of the audio level being less than −80 dB continues for a pre-set time interval since the timer is reset, processing transfers to the next sixth step SP6.

At the sixth step SP6, the control operation of discontinuing the recording operation is performed. Processing then transfers to the next seventh step SP7. Thus the recording operation is automatically discontinued if the state of the audio level being less than −80 dB continues for a pre-set time interval.

At the next seventh step SP7, the U-TOC data is re-written on the RAM enclosed in the system controller 4 so that data continuing for a pre-set time interval at the end part of the recorded audio data, for example, data continuing for 18 seconds, is separated as being audio data of another song or program. This automatically separates the silent invalid recorded portion, produced at the end part of the recorded audio data, from the valid recorded data.

At the next eighth step SP8, the U-TOC data on the RAM is rewritten for deleting the last program data portion separated at the seventh step SP7, that is the program data portion composed of data continuing for the above-mentioned pre-set time interval. The U-TOC data is then read out from the RAM of the system controller 4 so as to be recorded in the U-TOC region A22 of the recording/ reproducing region A20 of the disc 11b. This automatically deletes the silent invalid recorded portion produced towards the end part of the recorded audio data.

By such recording control, it is possible with the disc recording and/or reproducing apparatus of the present embodiment to discontinue recording automatically if, during the recording, the state of the audio level being less than −80 dB is continued for 20 seconds, in order to delete the silent audio data during the time interval beginning from a time point preceding a pre-set time from the terminal point of recording and ending at the terminal point of recording, that is, for the last 18 seconds.

With the disc recording and/or reproducing apparatus of the present embodiment, the program data portion consisting of data continuing for the above-mentioned pre-set time interval is automatically deleted as being the invalid recorded portion. However, the program data portion composed of data continuing for the pre-set time interval may also be deleted by a manual operation at the key input section.

Figure 7:
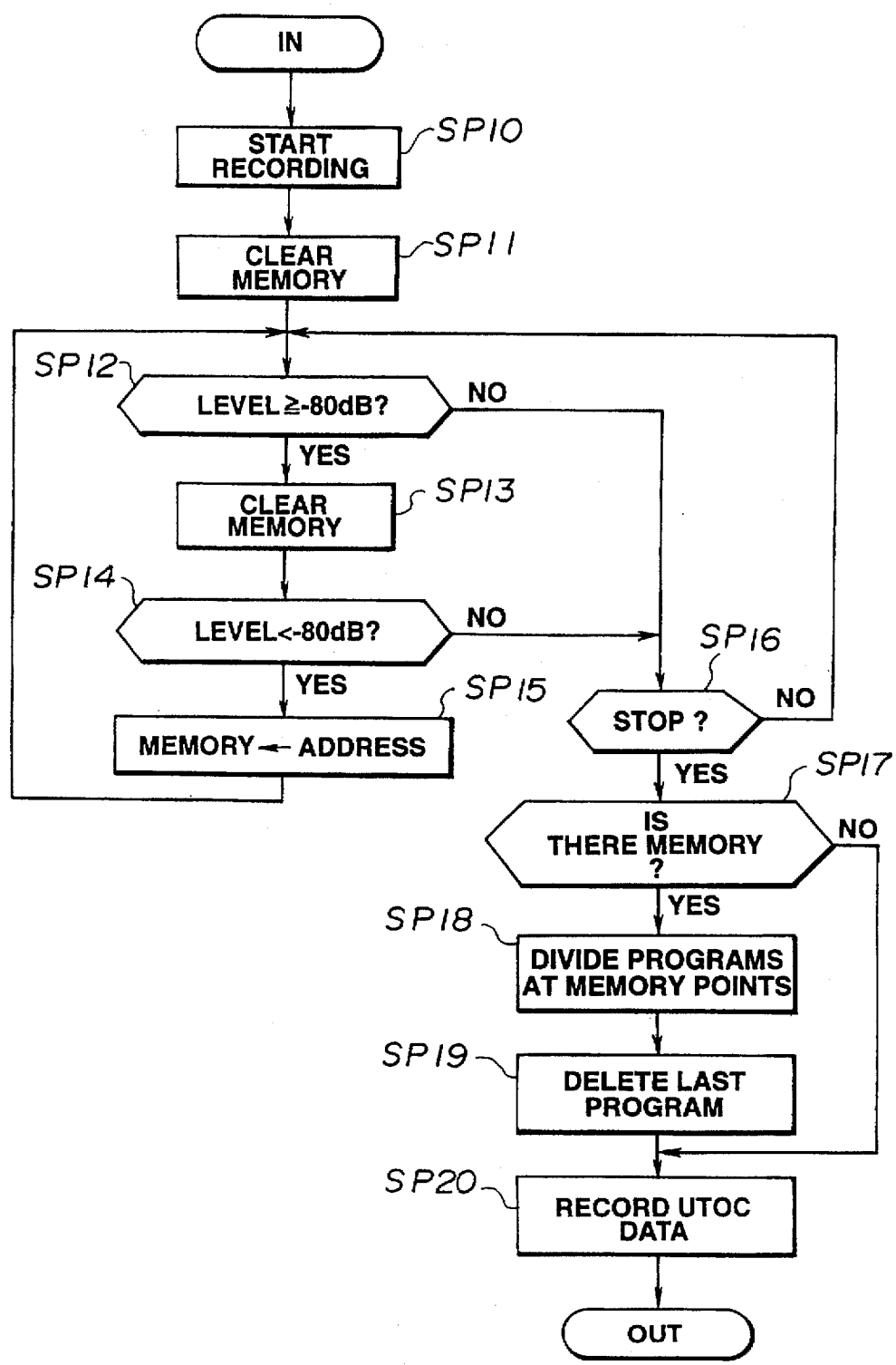
FIG. 7 is a flow chart showing another recording control of a system controller of the disc-shaped recording and/or reproducing apparatus shown in FIG. 1.

Also, when recording data by the disc recording and/or reproducing apparatus, the recording control may also be performed on the basis of the detection signal by the level detector 3 in accordance with the flow chart shown in FIG. 7, instead of performing the above-mentioned recording control in accordance with the flow chart shown in FIG. 6.

In the recording control shown in the flow chart of FIG. 7, the system controller 4 causes the recording to be started at a step SP10, when the recording mode is set, and causes the memory to be cleared at a second step SP11, before proceeding to the third step SP12.

The memory is used for storing the addresses indicating the audio data recording position, and is enclosed within the system controller 4.

At the third step SP12, the system controller 4 checks, based upon the detection signal by the level detector 3, whether or not the signal level of the audio signal to be recorded, that is the audio level, has reached −80 dB. If the result at the third step SP12 is YES, that is if the audio level is more than −80 dB, the system controller proceeds to a fourth step SP13 to clear the memory. The system processor then proceeds to the next fifth step SP14. If, at the third step SP12, the result of decision is NO, that is if the audio level is less than −80 dB, the system controller proceeds to a seventh step SP16.

At the fifth step SP14, it is checked, based on the detection signal by the level detector 3, whether or not the audio level becomes lower than a pre-set level, for example, −80 dB. If the result of decision at the fifth step SP14 is NO, that is if the audio level is higher than −80 dB, the system controller proceeds to the seventh step SP16. If the result of decision at the fifth step SP14 is YES, that is if the audio level is less than −80 dB, the system controller proceeds to a sixth step SP15 to store an address indicating the audio data recording position in the memory. The system controller 4 then reverts to the third step SP12 for iterating the operation of decision of the audio level. Thus, each time the audio level exceeds −80 dB, the memory is cleared, and an address indicating the leading recording position of the audio data having the audio level less than −80 dB is stored in the memory.

At the seventh step SP16, it is checked whether or not the recording has been discontinued. If, at the seventh step SP16, the result of decision is NO, that is if the apparatus is in the recording state, the system controller 4 reverts to the third step SP12 for iterating the operation of audio level decision. The system controller then proceeds to the next eighth step SP17.

If the system controller 4 accepts a stop command input from the input operating unit 19, or if the program region A21 of the recording/reproducing region A20 of the disc 11b becomes depleted of the recordable region, the system controller causes the recording operation to be discontinued.

At the eighth step SP17, the system controller decides whether or not an address indicating the leading storage position of the audio data having the audio level less than −80 dB is stored in the memory. If, at the eighth step SP17, the result of decision is YES, that is if such address is stored in the memory, the system controller proceeds to the next ninth step. If the result of decision is NO, that is if such address is not stored in the memory, the system controller 4 proceeds to the eleventh step SP20.

At the ninth step SP18, the U-TOC data is re-written on the RAM enclosed within the system controller 4 so that the recorded audio data bearing the addresses subsequent to the address stored in the memory will be separated as being audio data of another program or song. This automatically separates the effective recorded portion from the silent invalid recorded portion produced towards the end of the recorded audio data.

At the next tenth step SP19, the U-TOC data is re-written on the RAM for deleting the last program portion, as separated at the ninth step SP18, which is the invalid recorded portion.

At the next eleventh step SP20, the U-TOC data is read out from the RAM and recorded in the U-TOC region A22 of the recording/reproducing region A20 of the disc 11b. In this manner, if there is any silent invalid recorded portion towards the end of the recorded audio data, this invalid portion is deleted automatically.

The invalid portion may also be deleted at the tenth step SP19 by the manual operation of the input unit 19.

Although the above description has been made of the disc recording and/or reproducing apparatus employing a disc-shaped recording medium, such as an optical disc, the present invention may also be applied to a tape recording and/or reproducing apparatus employing a tape-shaped recording medium.

What is claimed is:

1. An apparatus for recording a first program of inputted data during a recording operation to a recording medium having address data pre-recorded thereon and also having a data recording region for recording said inputted data based upon said address data and a control data region for recording control data for said data recording region, said apparatus comprising:

storage means for storing an address if the signal level of the inputted data becomes lower than a pre-set level;

recording control means for stopping the recording operation and editing means for editing the recording control data in the control region for separating, from the recorded first program of inputted data, inputted data recorded downstream of the address stored in said storage means as invalid recorded data based upon the address data stored in said storage means;

wherein upon a subsequent recording operation, a second program of inputted data is recorded to the recording medium in succession to said first program thereby deleting said invalid recorded data.

2. The apparatus of claim 1, wherein the invalid recorded data is a silent portion of the first program of inputted data.

3. An apparatus for recording a first program of inputted data during a recording operation to a recording medium having address data pre-recorded thereon and also having a data recording region for recording said inputted data based upon said data and a control data region for recording control data for said data recording region, said apparatus comprising:

storage means for storing an address if the signal level of the inputted data becomes lower than a pre-set level;

recording control means for stopping the recording operation; and editing means for editing the recording control data in the control region for separating the data recording region into a data recorded region that contains the inputted data recorded upstream of the address stored in the storage means, and into a data recorded region that contains the inputted data recorded downstream of the address stored in said storage means;

wherein upon a subsequent recording operation, a second program of inputted data is recorded to the data recordable region of the recording medium in succession to the first program thereby deleting the inputted data recorded downstream of the address stored in said storage means.

4. The apparatus according to claim 3, wherein the inputted data recorded downstream of the address stored in said storage means is a silent portion of the first program of inputted data.

* * * * *

UNITED STATES PATENT AND TRADEMARK OFFICE
CERTIFICATE OF CORRECTION

PATENT NO. : 5,745,462
DATED : April 28, 1998
INVENTOR(S) : Junichi Aramaki

It is certified that error appears in the above-indentified patent and that said Letters Patent is hereby corrected as shown below:

In Col. 12, line 11, please add --address-- after "upon said".
In Col. 12, line 22, please change "storage means, and into a data recorded" to read --storage means, and into a data recordable--.

Signed and Sealed this

Seventh Day of July, 1998

Attest:

BRUCE LEHMAN

*Attesting Officer*  *Commissioner of Patents and Trademarks*